United States Patent
Dawe et al.

(10) Patent No.: US 12,373,115 B1
(45) Date of Patent: Jul. 29, 2025

(54) METHOD AND SYSTEM FOR STATELESS SOFTWARE CONTROL PLANE TO MANAGE STORAGE ACCESS AND RESOURCE LIMITS

(71) Applicant: Dell Products L.P., Round Rock, TX (US)

(72) Inventors: Trevor H. Dawe, Riverview (CA); Thomas L. Watson, Richardson, TX (US); Florian Coulombel, Lille (FR); Sharmila Ramamoorthy, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/622,103

(22) Filed: Mar. 29, 2024

(51) Int. Cl.
*G06F 3/06* (2006.01)

(52) U.S. Cl.
CPC .......... *G06F 3/0622* (2013.01); *G06F 3/0655* (2013.01); *G06F 3/0673* (2013.01)

(58) Field of Classification Search
CPC ..... G06F 3/0622; G06F 3/0655; G06F 3/0673
See application file for complete search history.

(56) References Cited

U.S. PATENT DOCUMENTS

| | | | |
|---|---|---|---|
| 2022/0046084 A1* | 2/2022 | Nair | H04N 21/4334 |
| 2023/0239374 A1* | 7/2023 | Balachandran | G06F 16/972 |
| | | | 709/223 |
| 2024/0080277 A1* | 3/2024 | Lee | H04L 67/60 |
| 2024/0146746 A1* | 5/2024 | Bhatia | H04L 63/1416 |
| 2024/0205091 A1* | 6/2024 | Bainbridge | H04L 41/145 |
| 2024/0403130 A1* | 12/2024 | Bagwell | G06F 9/5055 |
| 2024/0430155 A1* | 12/2024 | Goswami | H04L 41/0803 |

* cited by examiner

*Primary Examiner* — Sean D Rossiter
(74) *Attorney, Agent, or Firm* — Terrile, Cannatti & Chambers, LLP; Emmanuel A. Rivera

(57) ABSTRACT

Described herein are systems and methods for providing stateless management and storage system resource limitation of tenants of a container orchestration system, such as Kubernetes clusters in a Kubernetes orchestration system. The storage system resources accessible by the tenants are determined. Role-based Access Control (RBAC) and Quality of Service (QoS) limits of the tenants are defined and stored as files in a repository accessed by an authorization proxy server. The authorization proxy server through the files, verifies and authorizing the tenants to access the storage system resources.

17 Claims, 7 Drawing Sheets

METHOD AND SYSTEM FOR STATELESS SOFTWARE CONTROL PLANE TO MANAGE STORAGE ACCESS AND RESOURCE LIMITS

BACKGROUND OF THE INVENTION

Field of the Invention

The present invention relates to container-based applications running on information handling systems. More specifically, embodiments of the invention provide for providing stateless management and resource limitations of clusters of container orchestration systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An emerging technology is container orchestration systems employing container platforms, such as Kubernetes. Container orchestration systems provide containers, where a container is a standard package of software, bundling application code along with configuration files and libraries. The use of container based applications allows the ability to deploy applications seamlessly across various environments (e.g., information handling systems).

A container orchestration system includes several hardware and software components that work together to manage deployment and execution of container-based applications. A cluster is a group of nodes and pods. A node is the smallest unit of compute hardware in a cluster. A pod is the smallest execution unit in a cluster. Pods run on particular nodes. Containers/container based applications are grouped in pods.

In a cloud or on-premise environment, where multiple Kubernetes clusters use storage system resources for persistent storage, it may be desirable to limit access of the Kubernetes clusters to such storage system resources. This can be accomplished with the use of Role-based Access Control (RBAC). If restrictions are not implemented or storage systems do not provide their own native RBAC mechanisms, it can be possible for the Kubernetes clusters to obtain access to or modify storage system resources that belong to other Kubernetes clusters. Furthermore, in addition to RBAC, there may also be the need to provide Quality of Service (QoS) limitation requirements that are configured to prevent Kubernetes clusters (i.e., tenants) of the storage system resources from consuming too many resources.

SUMMARY OF THE INVENTION

A computer-implementable method, system and computer-readable storage medium for stateless management and storage system resource limitation of tenants of a container orchestration system comprising determining storage resource systems available to the tenants; defining through an administrator information handling system, files as to Role-based Access Control (RBAC) and Quality of Service (QoS) limits of the tenants; storing the defined files in a repository accessed by an authorization proxy server; and verifying and authorizing by the authorization proxy server access of the tenants to the storage system resources.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Described herein are systems and methods to provide for the use of Custom Resource Definitions (CRD) to define Role-based Access Control (RBAC) rules and Quality of Service (QoS) limitations. Implementations provide for the use of GitOps to manage and apply such RBAC rules and QoS limitations. System administrators (i.e., storage system resource/storage administrators) are provided the ability to define detailed/granular RBAC rules and QoS limitations for specific Kubernetes clusters. A central GitOps repository can be implemented without the use of Command Line Interface (CLI) or other such tooling. An authorization server can act as a proxy between Kubernetes clusters and storage system resources. The authorization server acts upon the RBAC rules and QoS limitations as defined by the system administrators. Implementations can further provide for the use of unique volume prefixes for each Kubernetes cluster (i.e., tenant), allowing for backend storage system resources to be the source of truth to determine which volumes are owned by each Kubernetes cluster (i.e., tenant). Such implementations can allow the authorization server to be stateless without having to track Kubernetes cluster (i.e., tenant) volume ownership and support the ability to keep track of quota as volumes may be expanded or deleted out of band from the authorization server.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
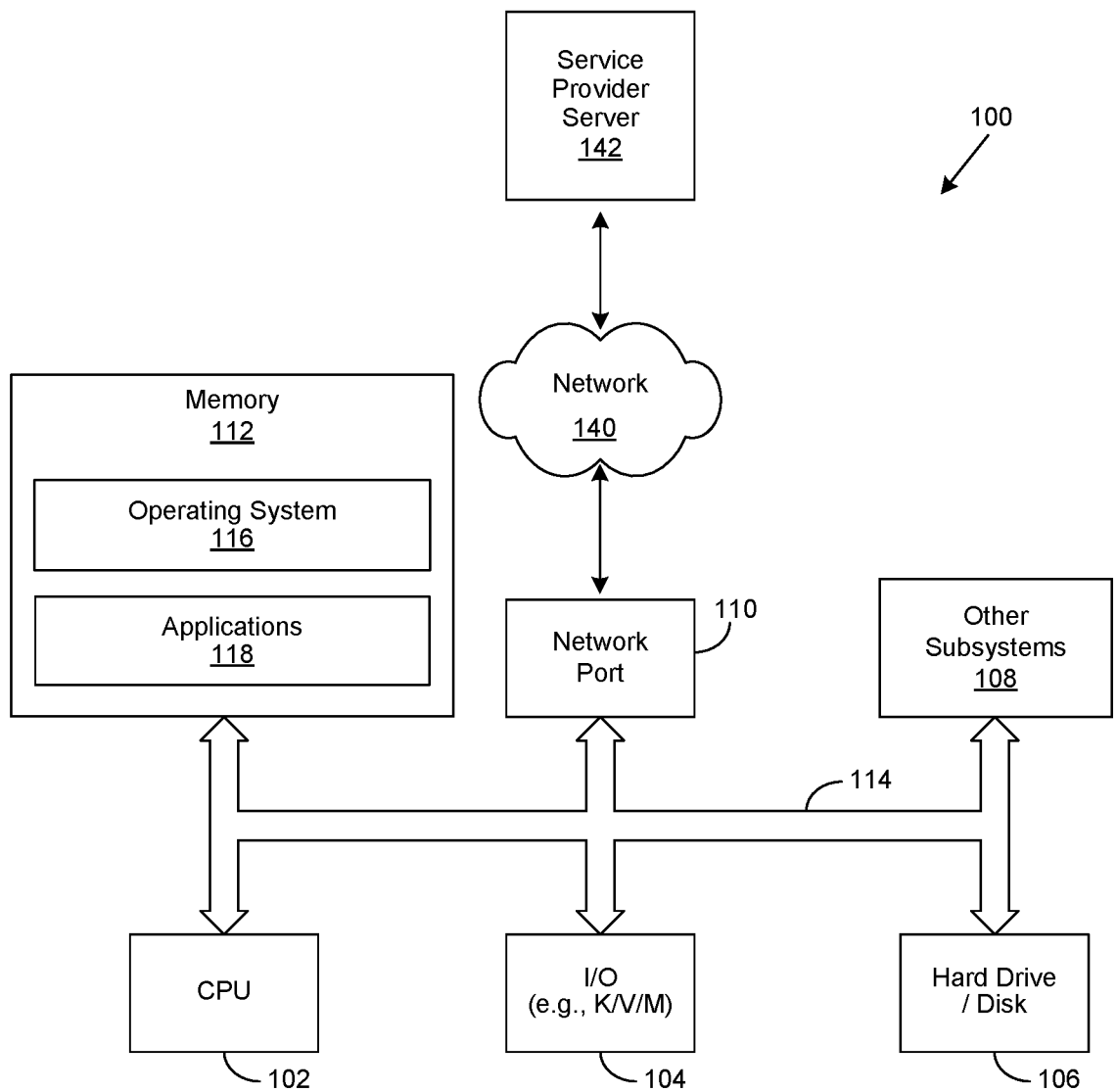
FIG. 1 is a general illustration of components of an information handling system as implemented in the present invention.

FIG. 1 is a generalized illustration of an information handling system (IHS) 100 that can be used to implement the system and method of the present invention. In particular, implementations provide for container orchestration systems and their components (e.g., container based applications), such as Kubernetes, to run on IHS 100.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116, and one or more application(s) 118.

Figure 2:
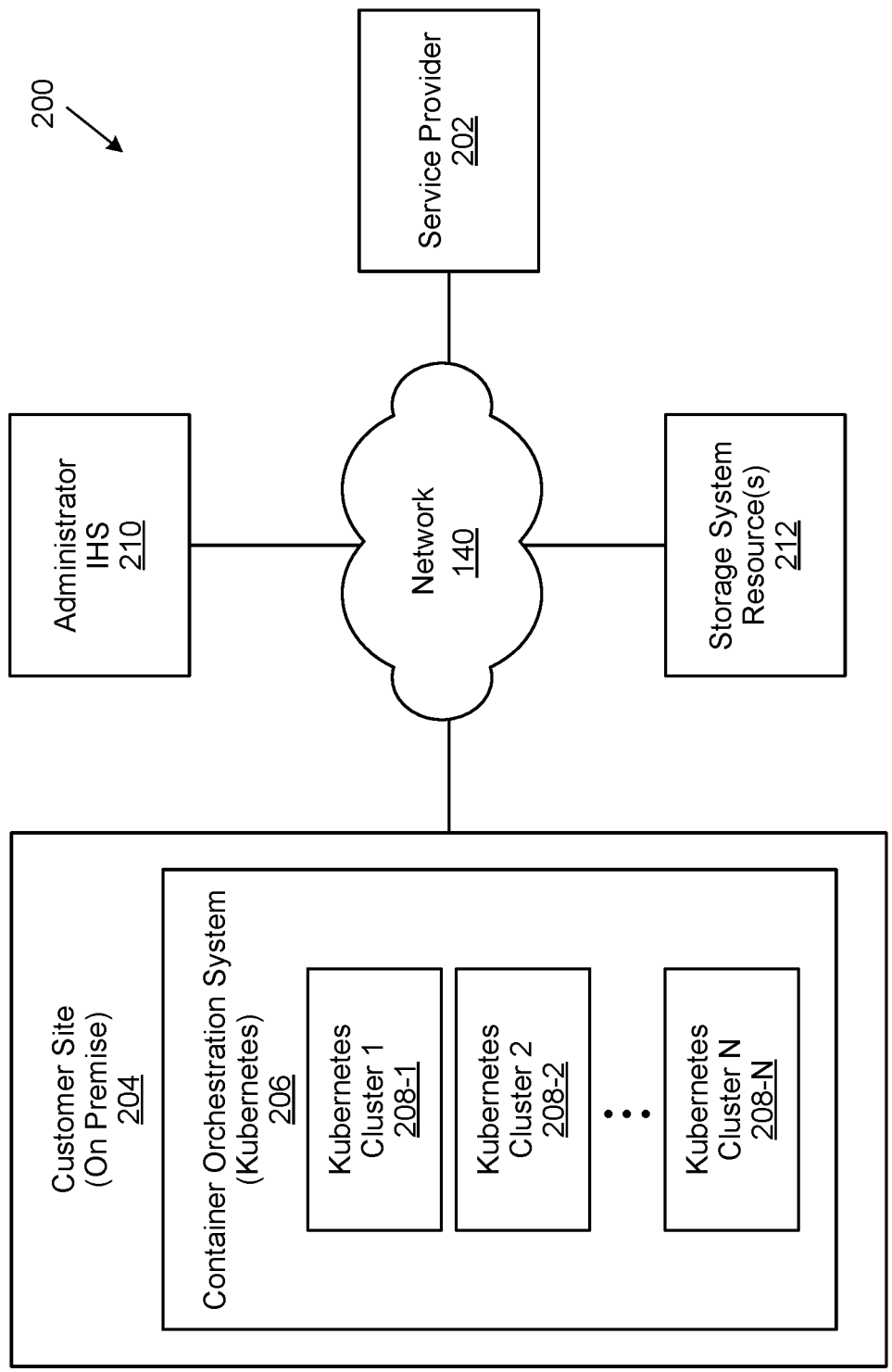
FIG. 2 illustrates a system as implemented in the present invention.

FIG. 2 illustrates a system as implemented in the present invention. The system 200 includes a service provider 202, which can represent a provider of products and services (i.e., resources) to a customer. The service provider 202 can implement service provider 142 described in FIG. 1. The service provider 202 can represent and/or include a website or cloud service.

The service provider 202 communicates through network 140 to a customer as represented by customer site (on premise) 204. Implementations provide for the customer site 204 to include a container orchestration system 206, such as Kubernetes. The container orchestration system (Kubernetes) 206 further includes one or more Kubernetes clusters 208 (i.e., Kubernetes clusters 208-1 to 208-N).

The container orchestration system (Kubernetes) 206 can be implemented in one or more information handling systems, such as IHS 100 described in FIG. 1. The Kubernetes clusters 208, as further described herein, include nodes that interact with one another to manage and implement containerized applications.

Implementations provide for an administrator IHS 210 to access the container orchestration system (Kubernetes) 206, and other components of system 200. Implementations provide for the administrator IHS 210 to reside at customer site (on premise) 204.

In various embodiments, the system includes one or more storage system resource(s) 212. The storage system resource(s) 212 can be embodied as physical, web based, and/or cloud based resources. Implementations provide for the storage system resource(s) 212 to be located at customer site 204, or off site (i.e., remote). Implementations provide for the service provider 202 to provide and support the storage system resource(s) 212. A group of storage system resource(s) 212 can be considered as a storage pool.

Figure 3:
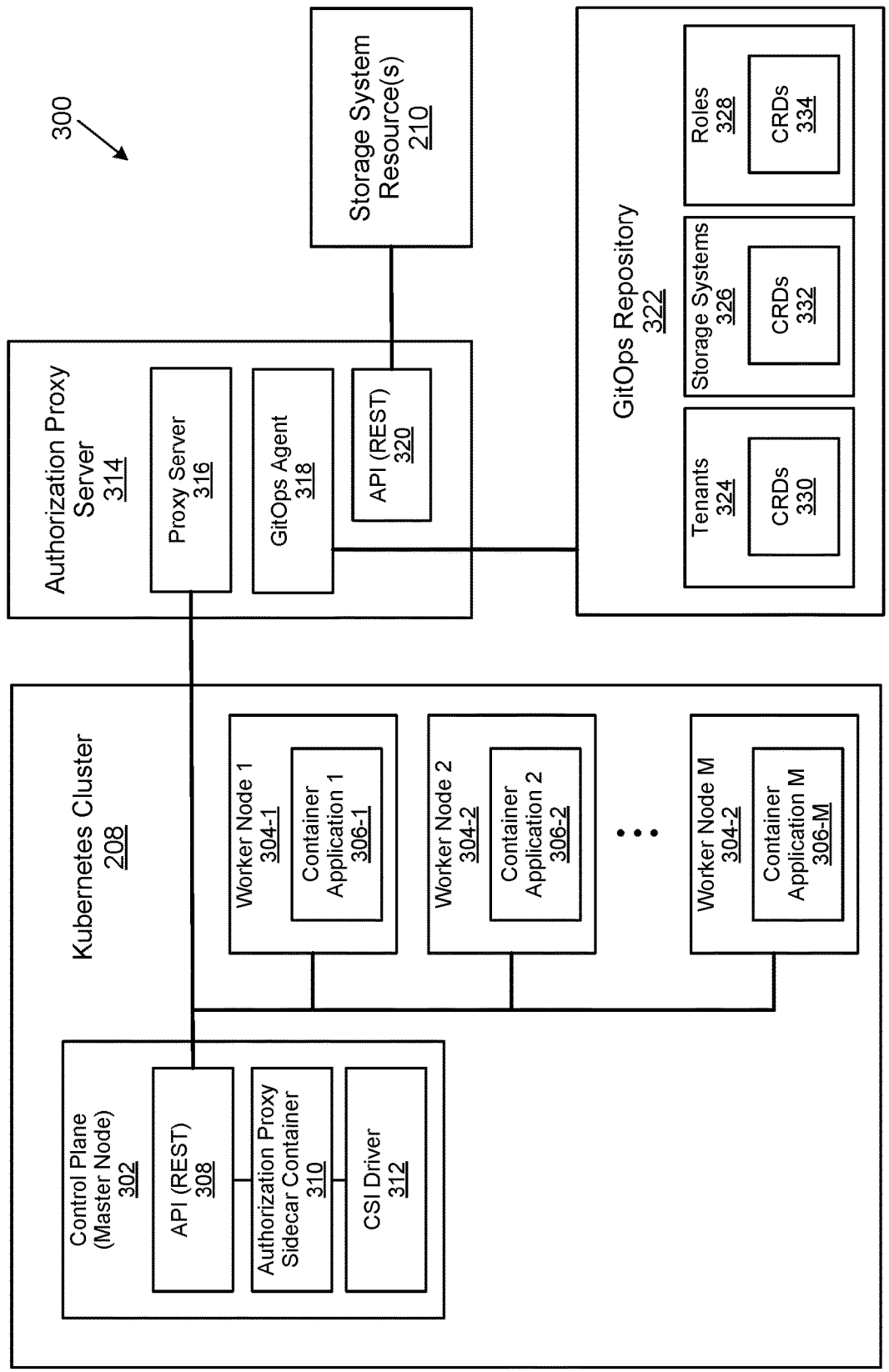
FIG. 3 illustrates a system that includes a container orchestration system as implemented in the present invention.

FIG. 3 shows a system that includes a container orchestration system as implemented in the present invention. The system 300 implements a container orchestration system, such as Kubernetes. Shown is a Kubernetes cluster 208 as described in FIG. 2. Kubernetes cluster 208 includes nodes, and in particular a master node or control plane 302, and worker nodes 304-1 to 304-M. The control plane 302 manages the worker nodes 304.

The worker nodes 304 include and run one or more containerized applications. In particular, as represented by respective container applications 306-1 to 306-M. An application 306 can be part of pod. A pod being a deployable unit of containers 306, which are components of an application workload. In other words, the worker nodes 304 is where containerized applications run. The worker nodes 304 are responsible for executing workloads and managing the container applications 306. Implementations provide for each worker node 304 to run a container runtime (e.g., Docker). The worker nodes 304 communicate with the control plane 302 to receive instructions about deployment and management of containers 306.

The control plane 302 manages the worker nodes 304 and pods in the Kubernetes cluster 208. The control plane 302 can run across multiple information handling systems (i.e., IHS 100). The Kubernetes cluster 208 can across multiple nodes to provide fault tolerance and high availability. The control plane 302 is responsible for managing overall Kubernetes cluster 208 state, making decisions as to scheduling applications, scaling resources, and maintaining desired configurations. The control plane 302 receives information such as Kubernetes cluster 208 activity, internal and external requests, etc. Based on these factors, the control plane 302 moves the cluster resources from current state to a desired state.

In various implementations, the control plane 302 can include and run various components, including a REST application program interface (API) 308, an authorization proxy sidecar container 310, and a container storage interface (CSI) driver 312. The REST API 308 is used by the control plane 302 and worker nodes 304 to communicate. In particular, the control plane 302 receives updates from the worker nodes 304 about current state of the Kubernetes cluster 208, and the worker nodes 304 receive instructions from the control plane 302 about deploying and managing container applications 306.

Implementations provide for the system 200 to include an authorization proxy server 314. The authorization proxy server 314 can include a proxy server component 316 which connects to the Kubernetes cluster 208 via the REST API 308 of the control plane 302.

In various implementations, an operational framework, such as GitOps is implemented. Such operational frameworks are used to automate infrastructure and manage software deployment. In certain embodiments, the authorization proxy server 314 includes a GitOps agent 318. The authorization proxy server 314 further can include a REST application program interface (API) 320 used to connect to storage system resource(s) 212.

Implementations provide for system 200 to include a repository, such as GitOps repository 322. The authorization proxy server 314 connects with the GitOps repository 322 through GitOps agent 318. GitOps repository 322 includes multiple files defining for example tenants 324, storage systems 326, and roles 328. The files include respective Custom Resource Definitions (CRDs) 330, 332, and 334. Through administrator IHS 210, the files can be defined by system administrators (i.e., storage system resource/storage administrators) to manage Role-based Access Control (RBAC) and Quality of Service (QoS) limits for storage system resource(s) 212.

In various embodiments, the authorization proxy server 314 and the GitOps repository 322 are located at a customer site or on premise, such as implemented on one or more information handling systems (IHS), accessible by a system administrator through administrator IHS 210.

Implementations provide for Role-based Access Control (RBAC) and Quality of Service (QoS) constructs to be created, as defined by CRDs 330, 332, and 334 of respective files tenants 324, storage systems 326, and roles 328. Such CRDs 330, 332, and 334 can be dynamically loaded and monitored through authorization proxy server 314. Through respective files tenants 324, storage systems 326, and roles 328, the CRDs 330, 332, and 334 are persisted on the GitOps repository 322. The CRDs 330, 332, and 334 support extension of a container orchestration system, such as Kubernetes, allowing for new APIs and custom controllers to manage container applications, such container applications 306. When a new custom container application 306 is created in a Kubernetes cluster 208, the container application 306 confirms to the specification of a CRD 330, 332, and 334 which includes providing values for specific fields in the CRD 330, 332, and 334, Definitions for CRD 330 resources for file tenants 324 can include the following. "Tenant" is a Kubernetes cluster 208 that has access to use a storage system resource(s) 208 for provisioning storage. "Name" is name of a tenant. "Volume Prefix" is added to each volume provisioned by a tenant, where volumes on a storage system with a specific prefix belong to a tenant. "Volume Prefix" is unique across all tenants. "Assigned Roles" are roles assigned to a tenant. "Revoked" if set to true, provides that requests from a tenant will not be forwarded to the storage system and an error will be returned. "Platform specific flags" provide that, depending on the storage platform, additional flags can be specified to support platform features. As an example, an approved Storage Data Client (SDC) flag can be used to allow a tenant to approve new SDCs not yet registered with a storage system resource(s) 212.

Definitions for CRD 332 resources for storage systems 326 can include the following. "Storage System" provides details about a storage system resource(s) 212 and how to connect to it. "Name" is the name of the storage system resource(s) 212. "Identifier" is a unique identifier as referenced by the role. "Type" is the type of the storage system resource(s) 212. "Endpoint" is the: REST API endpoint of the storage system resource(s) 212 for invoking requests to provision, export, delete volumes. "Credential Store" is a method to obtain credentials including Hashicorp Vault, encrypted secrets, etc.

Definitions for CRD 334 resources for roles 328 can include the following. "Role" contains storage system details, quota, and QoS limitations which can be assigned to a tenant. "Name" is the name of the role. "Storage System" is a storage system identifier. "Storage Pool" is a storage pool identifier. "Quota" is a volume quota assigned to the role. "QoS Limitations" are storage specific rules for managing QoS for provisioned volumes.

The system 300 allows for a system administrator through administrator IHS 210, to manage RBAC and QoS limits for storage systems resources 212, and to define the tenants 324, storage systems 326, and roles 328 in GitOps repository 322. In certain implementations, additional third party GitOps components, as represented by GitOps agent 318, can be installed on authorization proxy server 314 to allow management of synchronization between the GitOps repository 322 and authorization proxy server 314. Examples of third party GitOps components include ArgoCD and Flux CD, and can be configured by a Kubernetes administrator. When tenants 324, storage systems 326, and roles 328 are modified (e.g., added, updated, deleted) from the GitOps repository 322, such GitOps components can ensure that the authorization proxy server 314 is synchronized with the changes/modifications. Implementations provide for the authorization proxy server 314 to include Kubernetes controllers that reconcile new and updated CRDs as they are modified for Kubernetes cluster 208.

When CSI driver 312 invokes the REST API 308 to provision, update, or delete a storage system volume of storage system resources(s) 212, the authorization proxy server 314 intercepts the request to verify if the given tenant (i.e., Kubernetes cluster 208) has been granted access to the specific volume.

Figure 4:
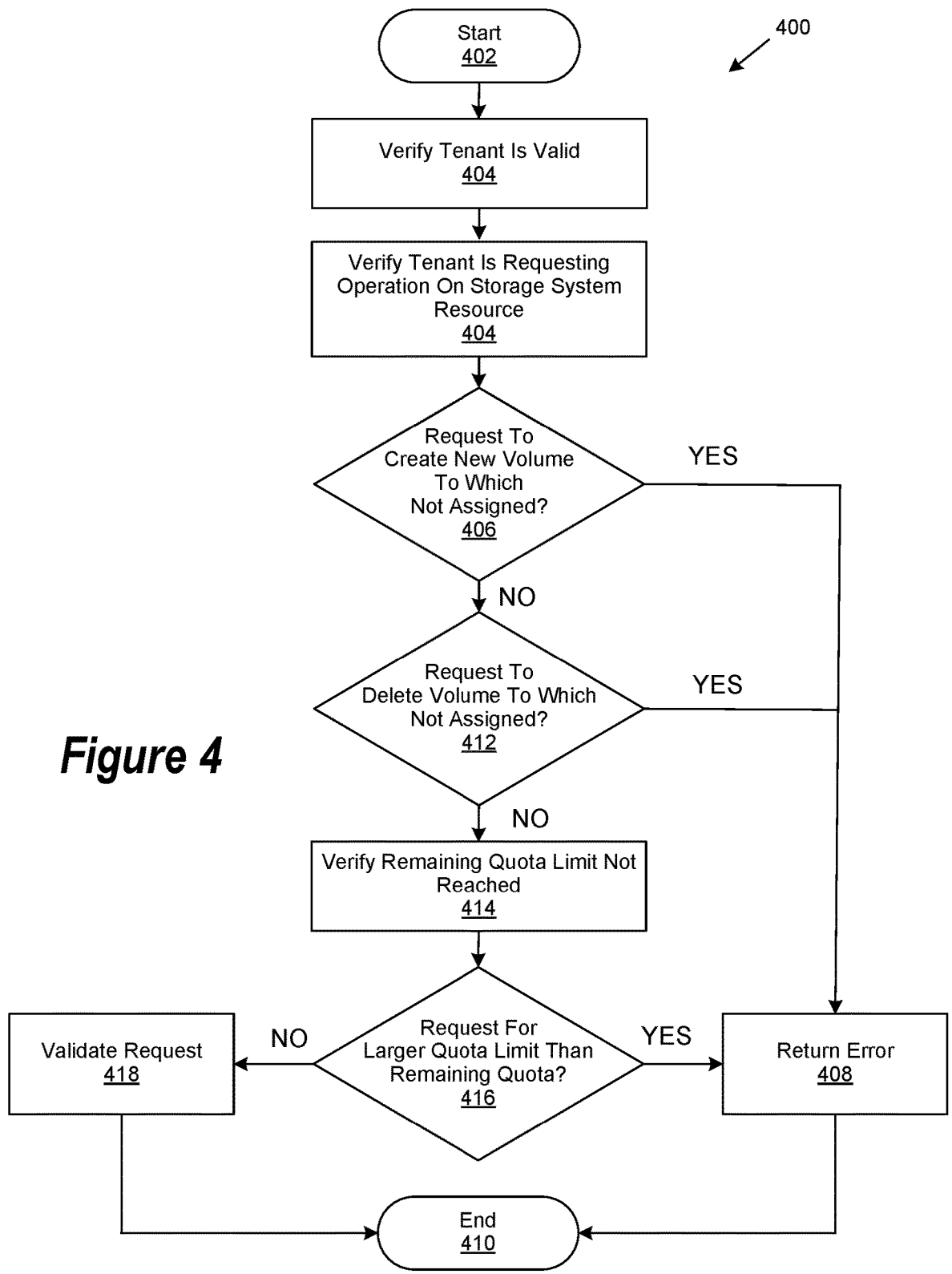
FIG. 4 is a generalized flowchart for validating access of a Kubernetes cluster (tenant) to a specific volume of a storage system resource.

FIG. 4 shows a generalized flowchart for validating access of a Kubernetes cluster (tenant) to a specific volume of a storage system resource. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, verification is performed to determine if the tenant (Kubernetes cluster 208) is valid. Implementations include verification based on a JSON Web Token (JWT) authentication header in a request from the tenant (Kubernetes cluster 208).

At step 404, verification is performed as to whether the tenant (Kubernetes cluster 208) is requesting an operation on storage system resources(s) 212 based on assigned roles to the tenant (Kubernetes cluster 208). If the tenant (Kubernetes cluster 208) is requesting a new volume to which it is not assigned, following the YES branch of step 406, at step 408, an error is returned to the tenant Kubernetes cluster 208). At step 410, the process 400 ends.

If the tenant (Kubernetes cluster 208) is requesting a new volume to which it is assigned, following the NO branch of step; 406, step 412 is performed. If the tenant (Kubernetes cluster 208) is requesting to delete a volume to which it is not assigned, following the YES branch of step 406, at step 408, an error is returned to the tenant Kubernetes cluster 208). At step 410, the process 400 ends.

If the tenant (Kubernetes cluster 208) is requesting to delete a volume to which it is assigned, following the NO branch of step 412, step 414 is performed. At step 414, verification is performed as to whether remaining quota for the tenant (Kubernetes cluster 208) has been reached.

If the request from tenant (Kubernetes cluster 208) is larger than the remaining quota, following the YES branch of step 416, at step 408, an error is returned to the tenant Kubernetes cluster 208). At step 410, the process 400 ends.

If request from the tenant (Kubernetes cluster 208) is not larger than the remaining quota, following the NO branch of step 416, step 418 is performed. At step 418, the request from the tenant (Kubernetes cluster 208) is verified. At step 410, the process 400 ends.

Figure 5:
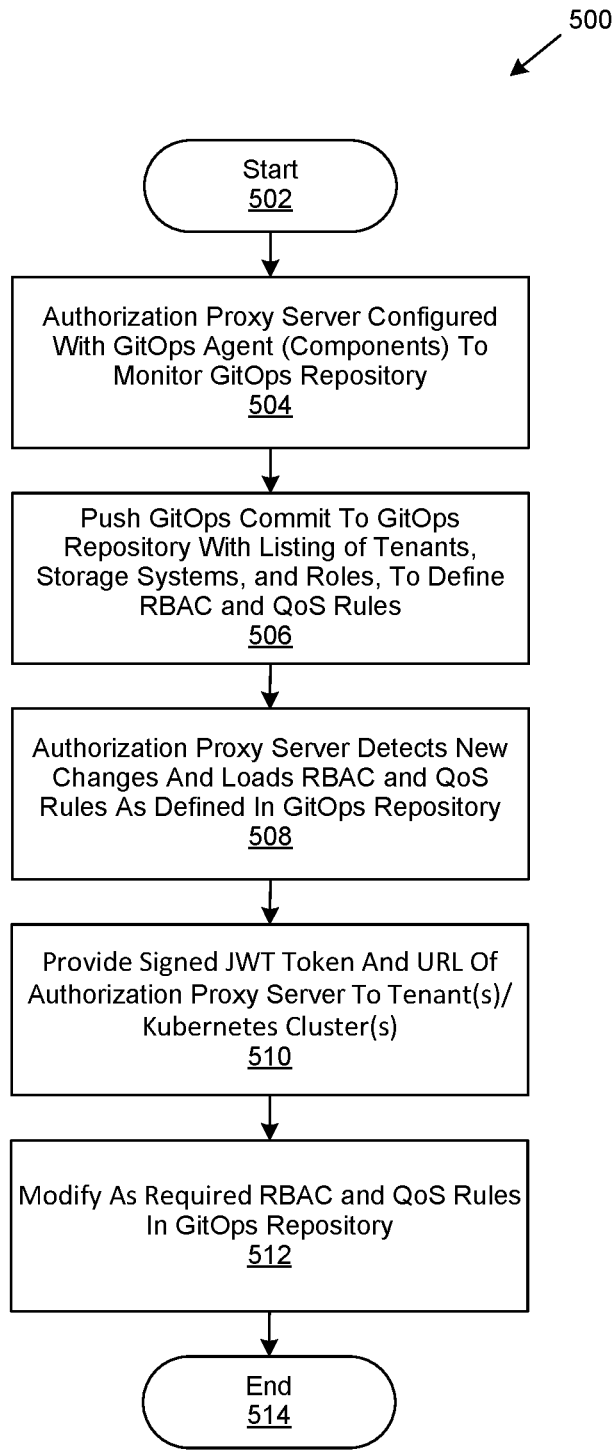
FIG. 5 is a generalized flowchart for setting up an authorization proxy server for use by tenants (i.e., Kubernetes clusters) for requesting storage resources.

FIG. 5 shows a generalized flowchart for setting up an authorization proxy server for use by tenants (i.e., Kubernetes clusters 208) for requesting storage resources. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, authorization proxy server 314 is deployed with third party GitOps components (i.e., GitOps agent 318) which are used to monitor the GitOps repository 322.

At step 506, a GitOps commit is sent/pushed to the GitOps repository 322 with a listing of CRDs for tenants 324, storage systems 326, and roles 328, defining RBAC and QoS rules to be applied.

At step 508, the authorization proxy server 314 detects any new changes CRDs for tenants 324, storage systems 326, and roles 328, and loads the RBAC and QoS rules as defined by the CRDs in the GitOps repository 322.

At step 510, a signed JWT token and URL of the authorization proxy server 314 is provided to each tenant (Kubernetes cluster 208). The URL and JWT token is used by the CSI driver 312 when performing storage operations, preventing the tenant (Kubernetes cluster 208) from having direct access or credentials to storage system resource(s) 212.

At step 512, as required, existing RBAC and QoS rules in the GitOps repository 322 are modified without having to directly interact with the authorization proxy server 314. When changes are made, authorization proxy server 314 is notified based on GitOps components (i.e., GitOps agent 318) that are monitoring for changes. At step 514, the process 500 ends.

Figure 6:
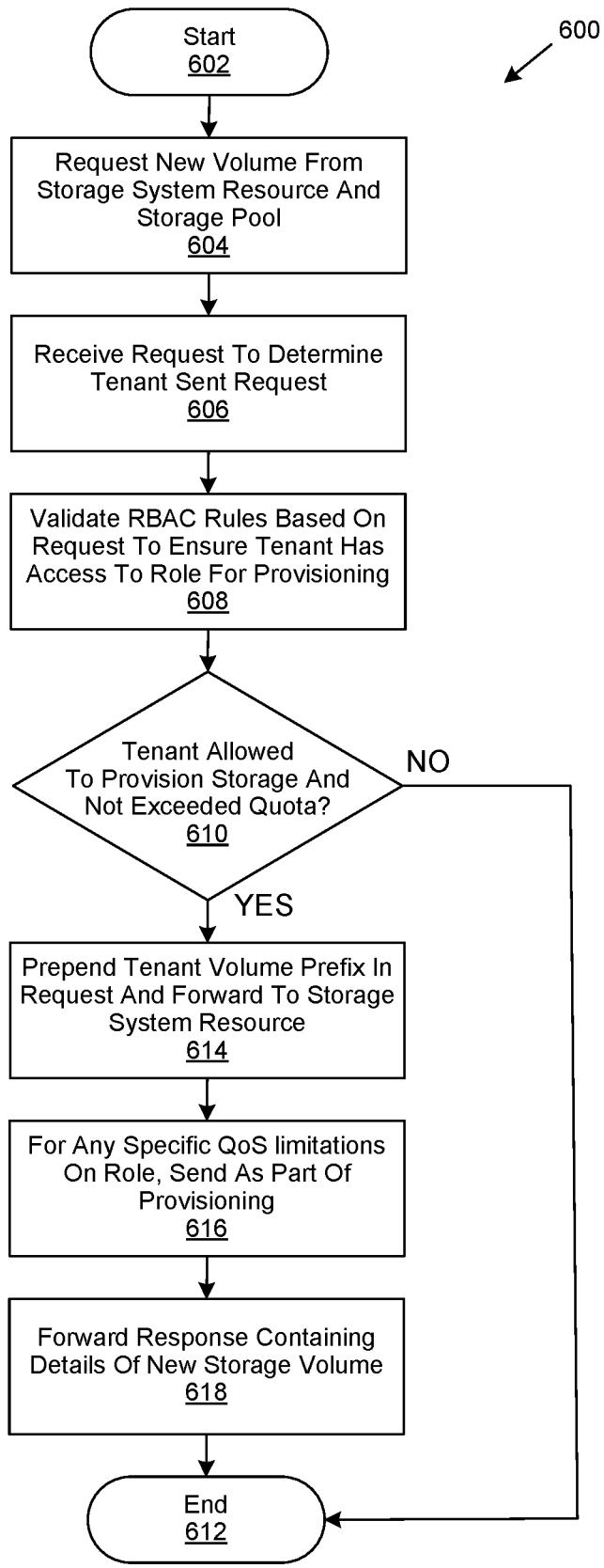
FIG. 6 is a generalized flowchart for a tenant (Kubernetes cluster) to request volume of storage system resources through an authorization proxy server.

FIG. 6 shows a generalized flowchart for a tenant (Kubernetes cluster) to request volume of storage system resources through an authorization proxy server. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, the CSI driver 312 requests a new volume from a storage system resource 212/storage pool. The request can be proxied to URL of the authorization proxy server 314 with a signed JWT in the header to authenticate the tenant (Kubernetes cluster 208).

At step 606, the authorization proxy server 314 receives the request and determines if the tenant (Kubernetes cluster 208) sent the request. This can be performed by validating the JWT in the header.

At step 608, the authorization proxy server 314 validates the RBAC rules based on the request to ensure the tenant (Kubernetes cluster 208) has access to a role for provisioning to the requested storage system resource 212.

If a tenant (Kubernetes cluster 208) is not allowed to provision storage or has exceeded its quota, following the NO branch of step 610, at step 612, the process 600 ends. If a tenant (Kubernetes cluster 208) is allowed to provision storage or has not exceeded its quota, following the YES branch of step 610, step 614 is performed. At step 614, the authorization proxy server 314 prepends the prefix of the tenant (Kubernetes cluster 208) in the request and forwards to the storage system resource 212.

At step 616, for any specific QoS limitations that are set on the role for the tenant (Kubernetes cluster 208), these specific QoS limitations are also sent as part of volume provisioning.

At step 618, the authorization proxy server 314 forwards a response back to the CSI driver 312. The response containing details as to the new storage volume. At step 612, the process 600 ends.

A similar process to process 600 can be implemented for additional APIs for exporting/mapping the volume to hosts on the tenant (Kubernetes cluster 208) to allow the tenant (Kubernetes cluster 208) to perform operations through the authorization proxy server 314.

Figure 7:
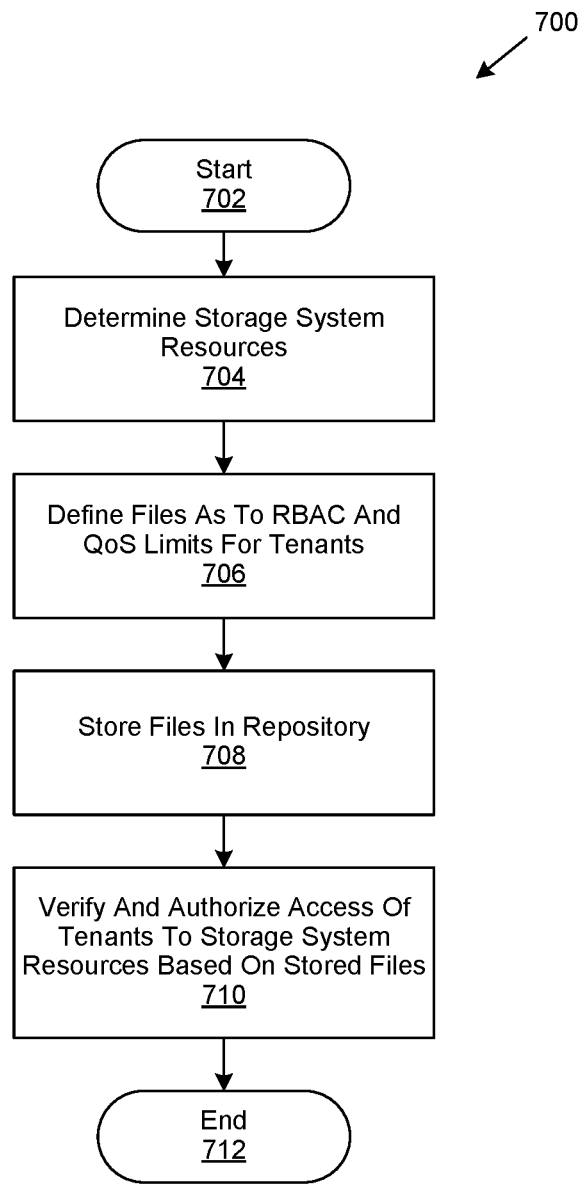
FIG. 7 is a generalized flowchart for providing stateless management and resource limitations of clusters of container orchestration systems.

FIG. 7 shows a generalized flowchart for providing stateless management and resource limitations of clusters (tenants) of container orchestration systems. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, a determination is performed as to available storage system resources 212 to tenants or Kubernetes clusters 208. At step 706, through an administrator IHS 210, files such as tenants 324, storage systems 326, and roles 328 as to RBAC and QoS limits are defined for the tenants or Kubernetes clusters 208. At step 708, the defined files are stored in a repository, such as GitOps repository 322. At step 710, through authorization proxy server 314, verification and authorization is performed as to access of tenants or Kubernetes clusters 208 to storage system resources 212 as defined by the stored files. At step 712, the process 700 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for stateless management and storage system resource limitation of tenants of a container orchestration system comprising:
    determining storage resource systems available to the tenants;
    defining through an administrator information handling system, files as to Role-based Access Control (RBAC) and Quality of Service (QoS) limits of the tenants;
    storing the defined files in a repository accessed by an authorization proxy server; and
    verifying and authorizing by the authorization proxy server access of the tenants to the storage system resources when a request is made by a tenant.

2. The computer-implementable method of claim 1, wherein the container orchestration system is Kubernetes, and the tenants are Kubernetes clusters.

3. The computer-implementable method of claim 1, wherein the defined files are related to tenants, storage systems, and roles, and include custom resource definitions.

4. The computer-implementable method of claim 1, wherein the repository is a GitOps repository, and the authorization proxy server accesses the GitOps repository through GitOps agents.

5. The computer-implementable method of claim 1, wherein the authorization proxy server accesses the storage system resources through a REST API.

6. The computer-implementable method of claim 1 further comprising allocating additional volumes to tenants as to the storage system resources.

7. A system comprising:
    a plurality of processing systems communicably coupled through a network, wherein the processing systems include non-transitory, computer-readable storage medium embodying computer program code interacting with a plurality of computer operations for stateless management and storage system resource limitation of tenants of a container orchestration system comprising:

determining storage resource systems available to the tenants;

defining through an administrator information handling system, files as to Role-based Access Control (RBAC) and Quality of Service (QoS) limits of the tenants;

storing the defined files in a repository accessed by an authorization proxy server; and verifying and authorizing by the authorization proxy server access of the tenants to the storage system resources when a request is made by a tenant.

8. The system of claim 7, wherein the container orchestration system is Kubernetes, and the tenants are Kubernetes clusters.

9. The system of claim 7, wherein the defined files are related to tenants, storage systems, and roles, and include custom resource definitions.

10. The system of claim 7, wherein the repository is a GitOps repository, and the authorization proxy server accesses the GitOps repository through GitOps agents.

11. The system of claim 7, wherein the authorization proxy server accesses the storage system resources through a REST API.

12. The system of claim 7, further comprising allocating additional volumes to tenants as to the storage system resources.

13. A non-transitory, computer-readable storage medium embodying computer program code for stateless management and storage system resource limitation of tenants of a container orchestration system, the computer program code comprising computer executable instructions configured for:

determining storage resource systems available to the tenants;

defining through an administrator information handling system, files as to Role-based Access Control (RBAC) and Quality of Service (QoS) limits of the tenants;

storing the defined files in a repository accessed by an authorization proxy server; and verifying and authorizing by the authorization proxy server access of the tenants to the storage system resources when a request is made by a tenant.

14. The non-transitory, computer-readable storage medium of claim 13, wherein the container orchestration system is Kubernetes, and the tenants are Kubernetes clusters.

15. The non-transitory, computer-readable storage medium of claim 13, wherein the defined files are related to tenants, storage systems, and roles, and include custom resource definitions.

16. The non-transitory, computer-readable storage medium of claim 13, wherein the repository is a GitOps repository, and the authorization proxy server accesses the GitOps repository through GitOps agents.

17. The non-transitory, computer-readable storage medium of claim 13, wherein the authorization proxy server accesses the storage system resources through a REST API.

* * * * *